(12) United States Patent
Shiotsu et al.

(10) Patent No.: US 9,761,917 B2
(45) Date of Patent: Sep. 12, 2017

(54) BATTERY UNIT

(71) Applicant: Panasonic Intellectual Property Management Co., Ltd., Osaka (JP)

(72) Inventors: Yoshihiro Shiotsu, Hyogo (JP); Hiroshi Takasaki, Osaka (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 40 days.

(21) Appl. No.: 14/895,208

(22) PCT Filed: Sep. 26, 2014

(86) PCT No.: PCT/JP2014/004940
§ 371 (c)(1),
(2) Date: Dec. 1, 2015

(87) PCT Pub. No.: WO2015/045404
PCT Pub. Date: Apr. 2, 2015

(65) Prior Publication Data
US 2016/0104923 A1  Apr. 14, 2016

(30) Foreign Application Priority Data
Sep. 30, 2013 (JP) .................................. 2013-204777

(51) Int. Cl.
*H01M 10/613* (2014.01)
*H01M 2/10* (2006.01)
(Continued)

(52) U.S. Cl.
CPC ....... *H01M 10/613* (2015.04); *H01M 2/1077* (2013.01); *H01M 2/1252* (2013.01); *H01M 2/1264* (2013.01); *H01M 10/0525* (2013.01)

(58) Field of Classification Search
CPC ............. H01M 10/613; H01M 2/1252; H01M 10/0525; H01M 2/1264; H01M 2/1077
See application file for complete search history.

(56) References Cited

U.S. PATENT DOCUMENTS

2009/0197153 A1   8/2009   Fujikawa et al.
2010/0104928 A1   4/2010   Nishino et al.
2012/0028089 A1*  2/2012   Mustakallio ........ H01M 2/1022
                                                        429/53

FOREIGN PATENT DOCUMENTS

JP   2008-117765   5/2008
JP   2009-212081   9/2009
(Continued)

OTHER PUBLICATIONS

International Search Report of PCT application No. PCT/JP2014/004940 dated Dec. 22, 2014.

*Primary Examiner* — Stewart Fraser
(74) *Attorney, Agent, or Firm* — McDermott Will & Emery LLP

(57) ABSTRACT

A battery unit includes the following elements: a battery module that includes a plurality of battery cells and a gas discharge opening for discharging gas jetted from each of the battery cells; and a gas discharge duct in communication with the gas discharge opening and discharging the gas to the outside of the battery module. The gas discharge duct includes at least one duct outlet of which cross-sectional area of the channel in the duct outlet or the sum of cross-sectional areas of the channel in the respective duct outlets is larger than a cross-sectional area of the channel on the upstream side in the flow direction of the gas. The gas discharge duct also includes a temperature reducing member that is fixed to the periphery of the duct outlet so as to block part of the channel and reduces the temperature of the gas going through gaps.

6 Claims, 12 Drawing Sheets

(51) Int. Cl.
*H01M 2/12* (2006.01)
*H01M 10/0525* (2010.01)

(56) References Cited

FOREIGN PATENT DOCUMENTS

| | | |
|---|---|---|
| JP | 2011-070871 | 4/2011 |
| JP | 2013-165013 | 8/2013 |

* cited by examiner

BATTERY UNIT

CROSS-REFERENCE TO RELATED APPLICATIONS

This application is a U.S. national stage application of the PCT International Application No. PCT/JP2014/004940 filed on Sep. 26, 2014, which claims the benefit of foreign priority of Japanese patent application 2013-204777 filed on Sep. 30, 2013, the contents all of which are incorporated herein by reference.

TECHNICAL FIELD

The present disclosure relates to a battery unit that includes a battery module, each including a plurality of battery cells and a gas discharge opening.

BACKGROUND ART

Patent Literature 1 describes a battery module that includes a case accommodating unit cells, and a gas discharge duct connected to a case opening provided in the case. In the battery module, the opening on the downstream side of the gas discharge duct has an area larger than the opening on the upstream side. The gas generated in the unit cells is discharge to the outside through the case opening and the gas discharge duct.

CITATION LIST

Patent Literature

PTL 1: Japanese Patent Unexamined Publication No. 2011-70871

SUMMARY OF THE INVENTION

The battery module described in Patent Literature 1 has room for improvement in reducing the increase in the gas pressure inside the battery module, in a structure of reducing the temperature of gas jetted from a unit cell (or battery cell) and discharged to the outside of the battery module.

A battery unit in accordance with an exemplary embodiment of the present disclosure includes the following elements: a battery module that includes a plurality of battery cells and a gas discharge opening for discharging gas jetted from each of the battery cells; and a gas discharge duct in communication with the gas discharge opening and discharging the gas to the outside of the battery module. The gas discharge duct includes at least one duct outlet of which a cross-sectional area of the channel in the duct outlet or the sum of cross-sectional areas of the channels in the respective duct outlets is larger than a cross-sectional area of the channel on the upstream side in the flow direction of the gas. The gas discharge duct also includes a temperature reducing member that is fixed to the periphery of the duct outlet so as to block a part of the channel and reduces the temperature of the gas going through gaps.

The battery unit in accordance with the exemplary embodiment of the present disclosure is capable of reducing the temperature of the gas jetted from a battery cell and discharged to the outside of the battery module and reducing the increase in the gas pressure in the battery module.

DESCRIPTION OF EMBODIMENT

Hereinafter, the exemplary embodiment of the present disclosure is detailed with reference to the accompanying drawings. In this description, the specific shapes, materials, numerical values, directions, or the like are only examples for ease of understanding the present disclosure, and may be changed appropriately for the applications, purposes, specifications, or the like. When a plurality of exemplary embodiments or variations is included in the following description, each element in the plurality of exemplary embodiments or variations can appropriately or optionally be combined for implementation. In all the following drawings, descriptions of substantially similar elements are omitted in some cases.

Figure 1:
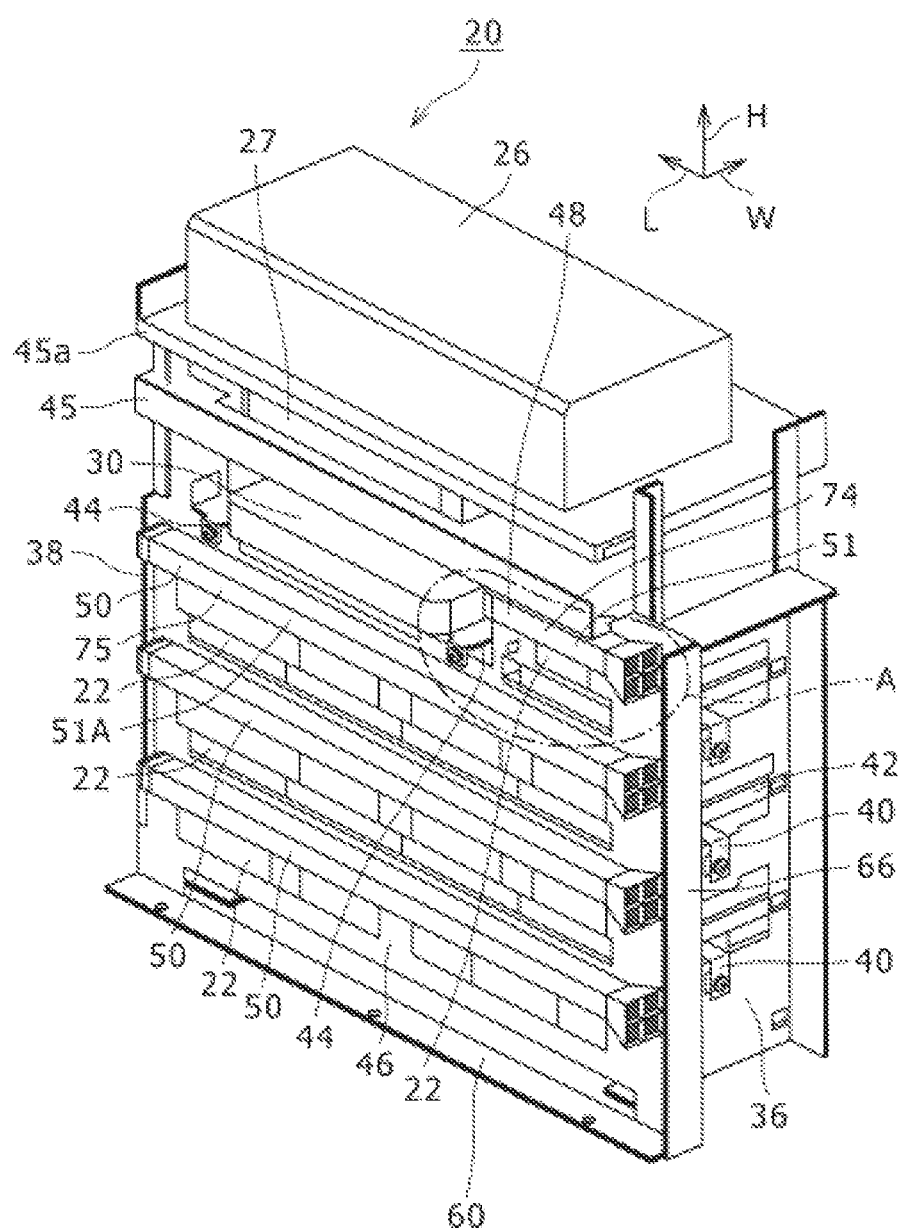
FIG. 1 is a perspective view showing a battery system, which is a battery unit in accordance with an exemplary embodiment of the present disclosure.
Figure 2:
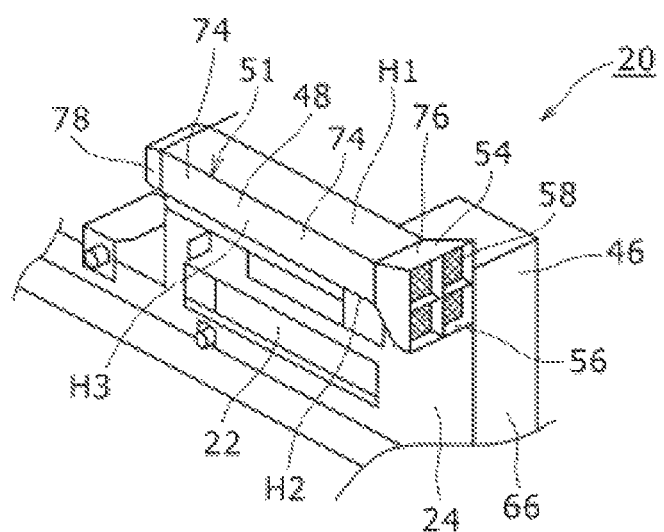
FIG. 2 is an enlarged view of A portion in FIG. 1.
Figure 3:
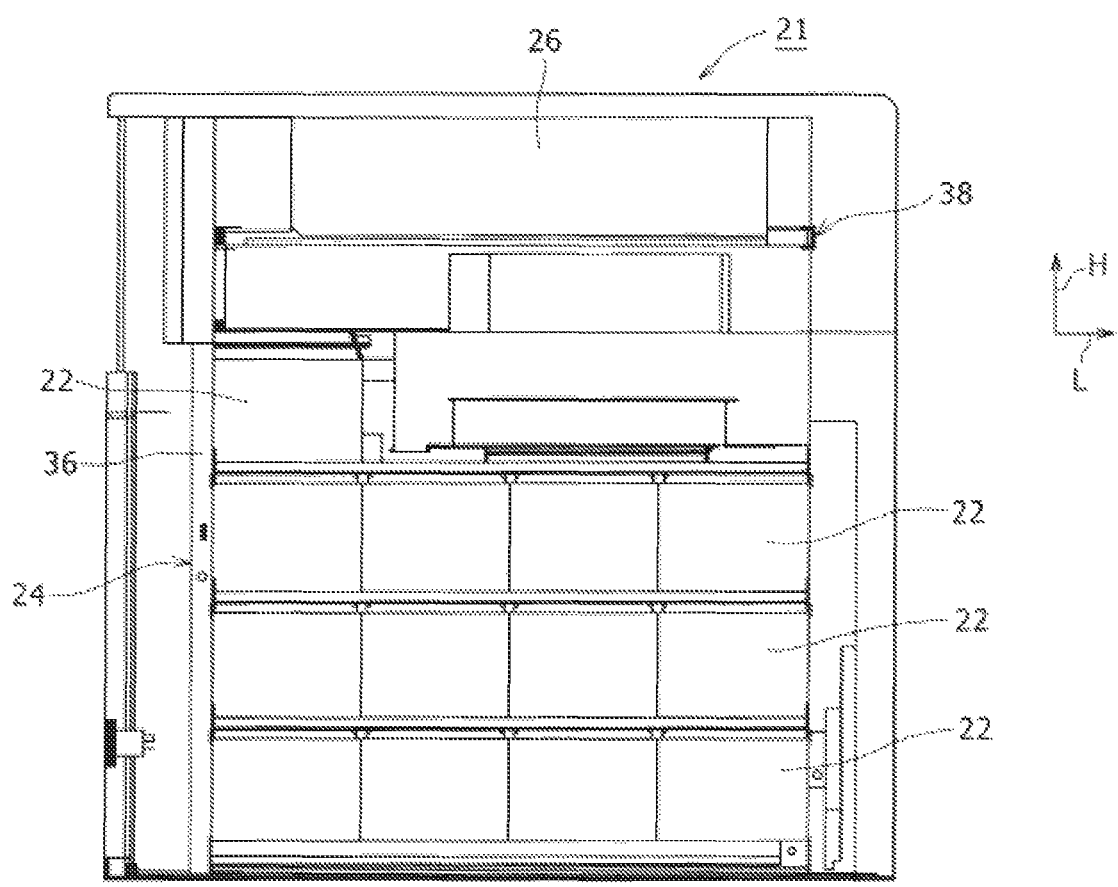
FIG. 3 is a drawing as viewed from the backside of the battery system of FIG. 1 with part thereof omitted.

FIG. 1 is a perspective view showing battery system 20, which is a battery unit in accordance with the exemplary embodiment of the present disclosure. FIG. 2 is an enlarged view of A portion in FIG. 1. FIG. 3 is a drawing viewed from the backside of battery system 20 of FIG. 1 with part thereof omitted. Battery system 20 is used as a power storage unit. Battery system 20 is configured to include plurality of battery modules 22, fixing member with duct 24 for integrally fixing plurality of battery modules 22, inverter 26, converter 27, and circuit board 30.

Battery system 20 has the following functions: charging, into battery module 22, electric power obtained by a generating set such as solar cells (not shown); stepping up or down the direct electric power extracted from battery modules 22 as necessary, using converter 27; converting to the alternating electric power, using inverter 26; and outputting the alternating power to electric devices (not shown). Circuit board 30 includes a controller for controlling the operation of inverter 26 and converter 27. Battery system 20 is fixed inside a case (not shown). Battery system 20 is not limited to the configuration to be used to store or supply the electric power from the generation set, and may be used at a power failure, for adjustment of electric power consumption, or the like. For instance, battery systems 20 may be used in the following manner. The electric power is stored from a commercial alternating power supply to battery systems 20 in a time zone when the electric power consumption is small in each of the buildings to which electric power is distributed. In a time zone when the electric power consumption is large or at a power failure, battery systems 20 may supply electric power to the electric devices in the buildings where battery systems 20 are installed. In this case, inverter 26 converts the supplied alternating electric power to direct electric power, and the direct electric power after conversion is stored in battery module 22.

FIG. 1, FIG. 3, and part of the drawings depicted later show three axial directions orthogonal to each other as height direction H, length direction L, and width direction W. Height direction H is a vertical direction or a perpendicular direction when battery system 20 is installed on a horizontal plane surface. Length direction L and width direction W are directions orthogonal to each other on the plane surface. Here, the direction in which the dimension of battery system 20 is large is set to length direction L, and the direction in which the dimension thereof is small is set to width direction W.

Fixing member with duct 24 is a frame member and includes duct frame 34 called a duct plate, two side frames 36, 38, plurality of connecting frames 40, 42, substrate supporting frame 44, and horizontal plate 45 so that these elements are integrally fixed to each other. Two side frames 36, 38 are first side frame 36 and second side frame 38. Plurality of connecting frames 40, 42 are first connecting frames 40 and second connecting frames 42. Duct frame 34 is configured by connecting vertically aligned plurality of duct forming members 48, 50 to frame body 46 as a body plate. Plurality of duct forming members 48, 50 is first duct forming member 48 and second duct forming members 50. Frame body 46 is formed by bending a plate-like member having a predetermined external shape and making holes therethrough. As shown by first duct forming member 48 in FIG. 2, each of first duct forming member 48 and second duct forming member 50 is formed so as to include first plate H1 and second plate H2, i.e. two upper and lower plates along the horizontal direction, and outer plate H3 that is connected to first plate H1 and second plate H2 along the perpendicular direction thereof. First duct forming member 48 is configured of first duct body 74 to which the side of frame body 46 is opened, and duct outlet member 76 and cover member 78 (FIG. 2) connected to corresponding ends of first duct body 74. Second duct forming member 50 is configured of second duct body 75 to which the side of frame body 46 is opened, and duct outlet member 76 and cover member 78 connected to the corresponding ends of second duct body 75. Each of duct bodies 74, 75 are combined to form a linear gas channel having a square cross-section so that the open end is blocked by the plate of frame body 46. Thereby, first gas discharge duct 51 and second gas discharge ducts 51A, i.e. a plurality of vertically aligned gas discharge ducts, are formed.

As shown in FIG. 2, uppermost first gas discharge duct 51 is connected to uppermost battery module 22, and in communication with gas discharge opening 52 (FIG. 5) provided in battery module 22. First gas discharge duct 51 has enlarged cross-section part 54 where the cross-sectional area of the channel is increased toward the downstream side in the flow direction of the gas. Temperature reducing member 58 is fixed on the periphery of duct outlet 56 in enlarged cross-section part 54, and reduces the temperature of the gas going through the gaps in temperature reducing member 58. This configuration can reduce the temperature of the discharge gas and reduce the increase in the internal pressure of battery module 22. This structure will be detailed later.

Returning to FIG. 1, each of first side frame 36 and second side frame 38 is fixed to the corresponding one of the two ends of duct frame 34 in length direction L, at right angles with respect to frame body 46 by screwing, so that the shape as viewed from the top is formed like a gate. First connecting frames 40 and second connecting frames 42 are connected by extending in the length direction in a plurality of positions in first side frame 36 and second side frame 38. Substrate supporting frame 44 is fixed by extending between one side frame (not shown) and frame body 46 in the width direction. The one side frame is fixed to first side frame 36 and second side frame 38 on one side thereof in the width direction (at the backside end in FIG. 1) by screwing. Circuit board 30 is fixed to substrate supporting frame 44.

Plurality of horizontal plates 45 extends so as to be vertically aligned at the top ends of first side frame 36 and second side frame 38 in length direction L. Both ends of each horizontal plate 45 in the length direction are fixed to corresponding side frames 36, 38 by screwing. Inverter 26 is fixed on horizontal plate 45 of the upper side, and converter 27 is fixed on horizontal plate 45 of the lower side.

At least one of first connecting frame 40 and second connecting frame 42 is bent on both sides along the length direction in the intermediate portion thereof, and thereby formed into a water pipe shape having corners and a U shaped cross-section. At least one of first connecting frame 40 and second connecting frame 42 is fixed to side frame 36 (or 38) on each of two sides in the length direction by screwing or engaging the peripheral parts of a hole formed in side frame 36 (or 38).

Figure 4:
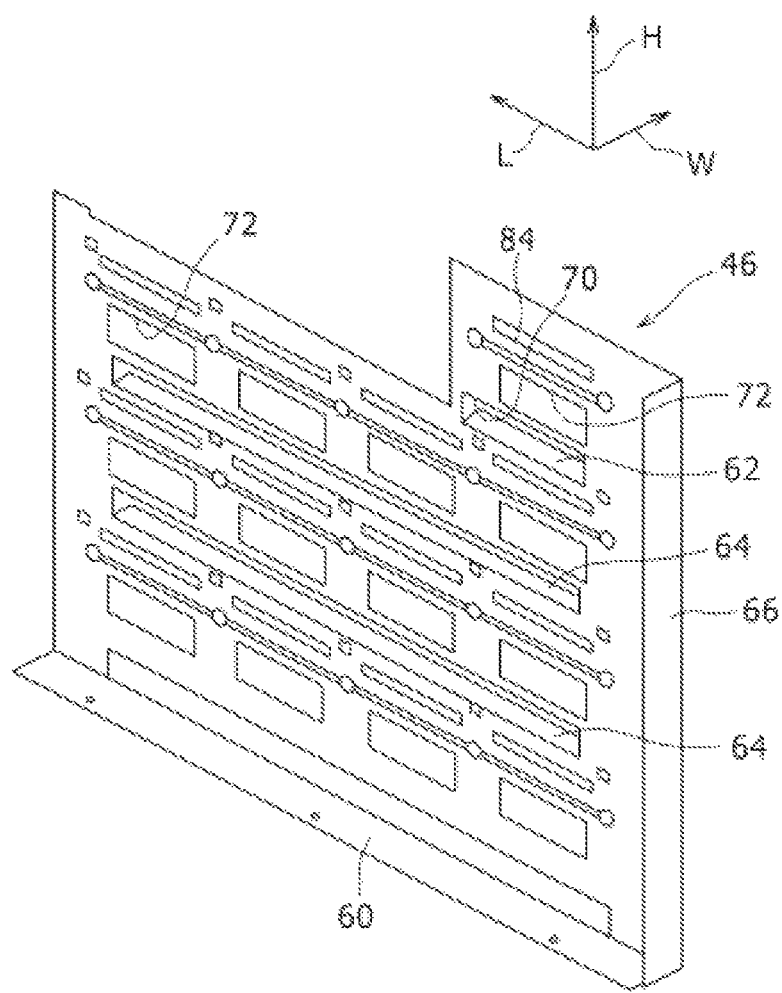
FIG. 4 is a perspective view showing a plate body taken out of the drawing in FIG. 1.

As shown in FIG. 4, frame body 46 is configured to include fall stopper plate 60 disposed at the bottom end, first battery supporting plate 62 and second battery supporting plates 64 as a plurality of battery supporting plates, and discharge gas blocking plate 66 disposed at one end in the length direction. First battery supporting plate 62 and second battery supporting plates 64 project from a plurality of positions in height direction H of frame body 46 to the other side (the backside in FIG. 4). Stopper plate 60 is formed by bending the bottom end of frame body 46 to the horizontal direction. Stopper plate 60 can be fixed to the upper side of the bottom plate of the case (not shown) by screwing.

As described later, battery modules 22 (FIG. 1) are mounted on battery supporting plates 62, 64. Discharge gas blocking plate 66 is formed by bending one end of frame body 46 in length direction L at right angles, along height direction H in the direction opposite battery modules 22. The function of discharge gas blocking plate 66 is described later. Frame body 46, each of side frames 36, 38, substrate supporting frame 44, and horizontal plates 45 are made of metal plates such as iron plates.

As shown in FIG. 3, battery modules 22 are fixed to fixing member with duct 24 so as to be arranged in four vertically aligned stages, and fixed by a connection means such as a bolt (not shown). Battery modules 22 may be fixed to fixing member with duct 24 without any bolt in the following manner. The battery modules are interposed between frame body 46 and the frames (not shown) connected by extending between the widthwise ends (in W direction) of first side frame 36 and second side frame 38.

One battery module 22 is fixed at the uppermost stage of fixing member with duct 24. Four battery modules 22 are fixed at each of the two middle stages and the lowermost stage. Thus, 13 battery modules 22 in total are disposed in battery system 20. In FIG. 3, the illustration of terminal parts 68 (FIG. 5) of battery modules 22 described later is omitted.

Each of battery modules 22 is formed into a rectangular parallelepiped shape. The number of battery modules 22 forming battery system 22 is not limited to 13, and is changed appropriately for the output or capacity required of battery system 20.

Figure 5:
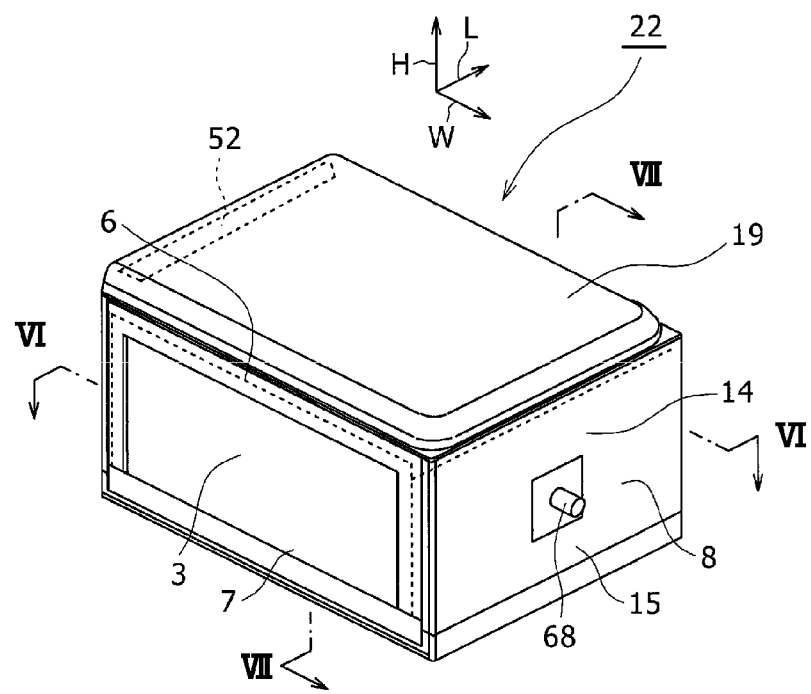
FIG. 5 is a perspective view showing one battery module taken out of the drawing in FIG. 1.
Figure 6:
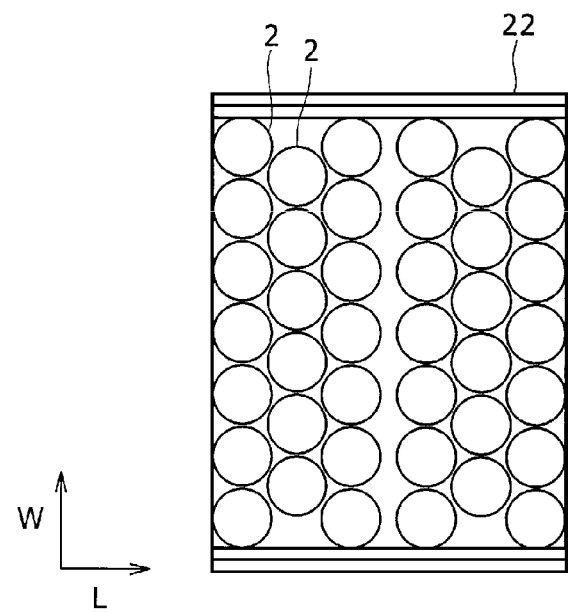
FIG. 6 is a sectional view taken along line VI-VI in FIG. 5.
Figure 7:
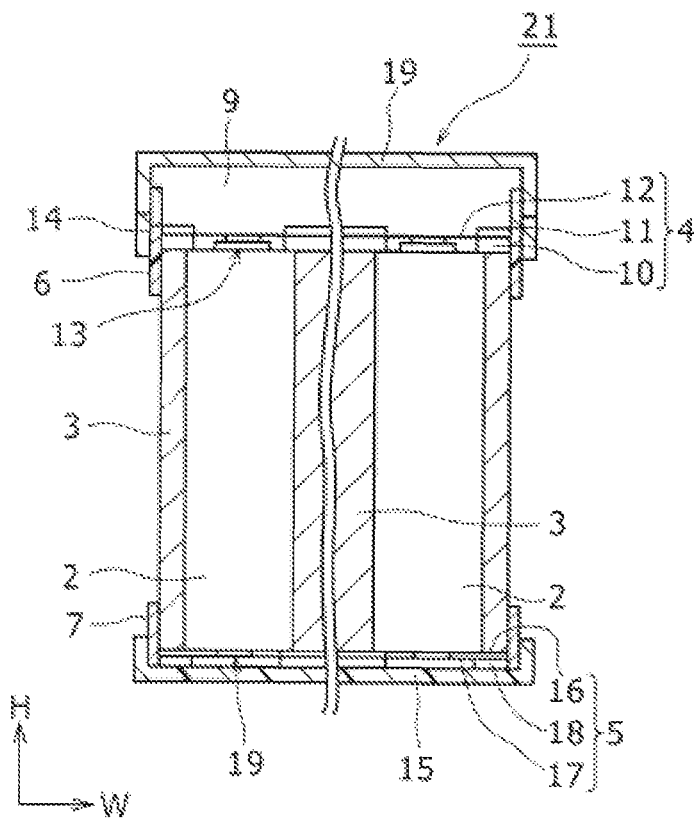
FIG. 7 is a sectional view taken along line VII-VII in FIG. 5.

FIG. 5 is a perspective view showing one battery module 22 taken out of the drawing in FIG. 1. FIG. 6 is a sectional view taken along line VI-VI in FIG. 5. FIG. 7 is a sectional view taken along line VII-VII in FIG. 5. When battery modules 22 are disposed in battery system 20, the length direction of battery module 22 corresponds to width direction W of battery system 20, and the width direction of battery module 22 corresponds to length direction L of battery system 20. At both ends of battery module 22 in the length direction, terminal parts 68 project. In two terminal parts 68, terminal part 68 on one side is a positive terminal, and terminal part 68 on the other side is a negative terminal. Terminal parts 68 are electrically connected to the electrodes of each battery cell in a minimum unit included in battery modules 22, and work as input/output terminals in charging/discharging the battery cell. Terminal parts 68 in plurality of battery modules 22 are electrically connected in parallel or in series by a bus bar (not shown).

As shown in FIG. 6, each battery module 22 includes a plurality of battery cells 2 arranged in a hound's-tooth (a staggered (zigzag)) pattern. In FIG. 6, the illustration of battery cell case 3 (FIG. 7) holding plurality of battery cells 2, which will be described later, is omitted. Battery module 22 is configured by connecting plurality of battery cells 2 in parallel so that a predetermined battery capacity can be obtained. Here, an example of using 40 battery cells 2 is shown.

As shown in FIG. 7, in battery module 22, the positive electrode sides of 40 battery cells 2 are aligned on one side and the negative electrode sides thereof are aligned on the other side, so that the battery cells are arranged in a predetermined positional relation. Battery module 22 is configured so as to include battery cells 2, battery cell case 3, upper holder 6, lower holder 7, module case 8, and module duct 19. Battery cell case 3 houses and holds battery cells 2. Positive electrode-side current collecting part 4 is disposed on the positive electrode side, and negative electrode-side current collecting part 5 is disposed on the negative electrode side. Positive electrode-side current collecting part 4 and negative electrode-side current collecting part 5 are connected to battery cell case 3 via upper holder 6 and lower holder 7. In the structure where battery cells 2 discharge gas from the negative electrode side, the negative electrode sides of battery cells 2 may be aligned on one side and the positive electrode sides thereof may be aligned on the other side in battery module 22 so that the battery cells are arranged in a predetermined positional relation.

Battery cell 2 is a chargeable/dischargeable secondary battery that is a minimum unit of a battery that forms battery module 22. As the secondary battery, a lithium ion battery is used. Other examples include a nickel-metal hydride battery and an alkali battery. The 40 battery cells 2 included in battery module 22 are arranged so that 20 battery cells form one set and two sets are disposed side by side. The 40 battery cells are arranged in a hound's-tooth pattern, which minimizes the space between adjacent battery cells 2 in each set. Three battery lines are arranged in length direction L. The battery lines contain 7, 6, and 7 battery cells 2 along width direction W.

Battery cell 2 has a cylindrical external shape. At both ends of the cylindrical shape, one end is used as a positive electrode terminal and the other end is used as a negative electrode terminal. In this exemplary embodiment, positive terminals are provided at the top end and negative terminals are provided at the bottom end of battery cells 2 shown in FIG. 7. Battery cell 2 is not limited to a cylindrical battery and may be a battery having another external shape.

Each of battery cells 2 has safety valve 13 on the positive terminal side. Safety valve 13 functions to release exhaust gas from the inside of a battery to the outside of the cell when the pressure of the gas generated by the electrochemical reaction performed inside battery cell 2 exceeds a predetermined threshold pressure. Safety valve 13 may be configured so as to include a metal sheet that is broken or a valve body that leaves the valve seat when the gas pressure exceeds the threshold pressure.

Battery cell case 3 is a holding container for arranging and holding 40 battery cells 2 in a predetermined positional relation. Battery cell case 3 is a frame body that has a height equal to that of each of battery cells 2, and has 40 battery holding parts in through-hole shapes with openings at each of two ends in height direction H. Each of battery cells 2 is held and disposed in one of the battery holding parts.

Corresponding to the positional relation of battery cells 2, battery holding parts are arranged in a hound's-tooth (a staggered (zigzag)) pattern. That is, two sets are disposed side by side, each set contains 3 lines of battery holding parts in length direction L, and the battery holding lines contain 7, 6, and 7 battery holding parts along width direction W. It is only necessary that such battery cell case 3 is made of material having a high thermal conductivity. For instance, such a battery cell case may be mainly made of aluminum, for example, and formed into a predetermined shape by extrusion molding.

When 40 battery cells 2 are held in the battery holding parts in battery cell case 3, the positive electrode sides of battery cell 2 are aligned on one side and the negative electrode sides thereof are aligned on the other side. In FIG. 7, the one side is the upper side of the page along height direction H. The other side is the lower side of the page along height direction H. The battery cell case may have the following configuration. Two sets of separable battery cell cases, each including 20 battery holding parts, are arranged side by side.

Positive electrode-side current collecting part 4 is a connecting member disposed to block the openings on one side of battery cell case 3 and electrically connecting the positive electrode sides of battery cells 2 disposed in an arrangement. Positive electrode-side current collecting part 4 is composed of positive electrode-side insulating plate 10, positive electrode plate 11, and positive electrode lead plate 12.

Positive electrode-side insulating plate 10 is made of plate material disposed between battery cell case 3, positive electrode plate 11, and positive electrode lead plate 12, and electrically insulating therebetween. Positive electrode-side insulating plate 10 has 40 openings in a circular shape, for example, from which the corresponding positive electrodes of battery cells 2 project. Examples of such positive electrode-side insulating plate 10 include a plate that is made of a resin molding or a resin sheet having a predetermined heat resistance and electrically insulating property and is formed into a predetermined shape.

Positive electrode plate 11 is a thin plate having a positional relation so that 40 electrode contact parts are in separate contact with the corresponding positive electrodes of battery cells 2. Examples of such positive electrode plate 11 include a metal thin plate having electrical conductivity in which electrode contact parts are formed into a predetermined shape having a substantially C-shaped notch (cut-away portion) on the periphery thereof by etching or pressing.

Positive electrode lead plate 12 is an electrode plate that is electrically connected to positive electrode plate 11 and interconnects the 40 electrode contact parts to form at least one positive electrode-side output terminal. Examples of such positive lead plate 12 include a metal thin plate having electrical conductivity and a suitable thickness and strength. Examples of electrode lead plate 12 includes a metal thin plate in which electrode contact parts in a predetermined shape having an opening, in a circular shape, for example, are formed by etching or pressing.

Negative electrode-side current collecting part 5 is a connecting member disposed in the opening on the other side of battery cell case 3 and electrically connecting the negative electrode sides of battery cells 2 disposed in an arrangement. Negative electrode-side current collecting part 5 is composed of negative electrode-side insulating plate 16, negative electrode plate 17, and negative lead plate 18.

Negative electrode-side insulating plate 16 is made of plate material disposed between battery cell case 3, negative electrode plate 17, and negative lead plate 18, and electrically insulating therebetween. Negative electrode-side insulating plate 16 has 40 openings in a circular shape, for example, from which the corresponding negative electrodes of battery cells 2 are exposed. Examples of such negative electrode-side insulating plate 16 include a plate that is made of a resin molding or a resin sheet having a predetermined heat resistance and electrically insulating property and is formed into a predetermined shape.

Negative electrode plate 17 is an electrode member having a positional relation so that 40 electrode contact parts are in separate contact with the corresponding negative electrodes of battery cells 2. Examples of such negative electrode plate 17 include a metal thin plate having electrical conductivity in which partitioned electrode contact parts are formed by forming substantially C-shaped notches (cut-away portions) by etching or pressing. In each of the electrode contact parts of negative electrode plate 17, a current-blocking element may be disposed so as to fuse when a predetermined threshold temperature is exceeded by an overcurrent flowing through battery cell 2.

Negative electrode lead plate 18 is an electrode plate that is electrically connected to negative electrode plate 17 and interconnects the 40 electrode contact parts so as to form at least one negative electrode-side output terminal. Examples of each negative electrode lead plate 18 include a metal thin plate having electrical conductivity and a suitable thickness and strength so that openings in a circular shape, for example, are formed correspondingly to the electrode contact parts of negative electrode plate 17 by etching or pressing.

Upper holder 6 and lower holder 7 are members used to integrate positive electrode-side current collecting part 4 disposed on one side of battery cell case 3 and negative electrode-side current collecting part 5 disposed on the other side, together with battery cell case 3. The upper holder and the lower holder are made of insulating material. For instance, upper holder 6 and lower holder 7 integrate positive electrode-side current collecting part 4 and negative electrode-side current collecting part 5, using a fastening member such as a bolt. The holders do not need to be formed separately. For instance, the side parts covering the side faces of battery cell case 3, the top part covering the positive electrode side, and the bottom part covering the negative electrode side may be integrally formed. Holders 6, 7 are fixed to the inside of module case 8, and module case 8 is formed of duct cover 14 on the upper side and bottom cover 15 on the bottom side.

In the top part of battery module 22 configured as above, module duct 19 having duct room 9 inside, an opening on the bottom side, and having a U-shaped cross section is disposed. Module duct 19 is provided on the upper side of upper holder 6 so as to cover the upper holder, and fixed to the upper side of the upper-side opening peripheral edge of duct cover 14 whose upper end forms a frame shape. In contrast, on the bottom side of negative electrode-side current collecting part 5, bottom cover 15 connected to duct cover 14 is provided.

Duct room 9 is opposed, via openings or notches, to the positive electrode terminals of battery cells 2 provided with safety valves 13, and in communication with gas discharge opening 52 (FIG. 5) formed in one end face of module duct 19 in the length direction thereof. Thus, the gas jetted from safety valve 13 of each of battery cells 2 can be discharged to the outside from duct room 9 via gas discharge opening 52. As described later, gas discharge openings 52 communicate with gas discharge ducts 51, 51A, and the gas jetted from each battery cell 2 is discharged to the outside of battery modules 22 through gas discharge ducts 51, 51A. It is only necessary that module duct 19 is made of highly thermal-conductive material. For instance, the module duct is formed of a metal plate predominantly composed of aluminum, for example.

In the case described above, battery cells 2 are parallel-connected, as battery module 22. However, the battery module may contain side-by-side two sets of series-connected battery cells, or three or more sets of series-connected or parallel-connected battery cells.

Figure 8:
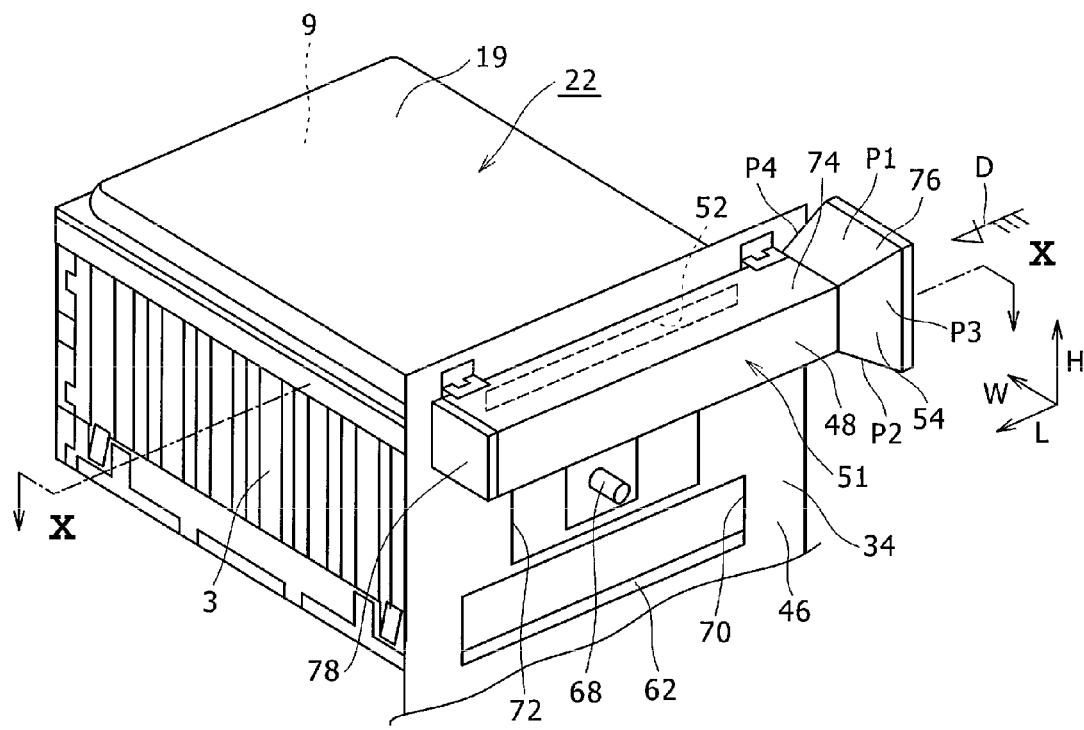
FIG. 8 is an enlarged perspective view showing a configuration in which a battery module on the uppermost shelf is connected to a gas discharge duct.
Figure 9:
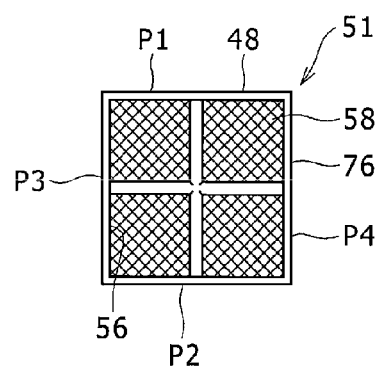
FIG. 9 is a drawing showing an outlet of the gas discharge duct viewed along arrow D in FIG. 8.
Figure 10:
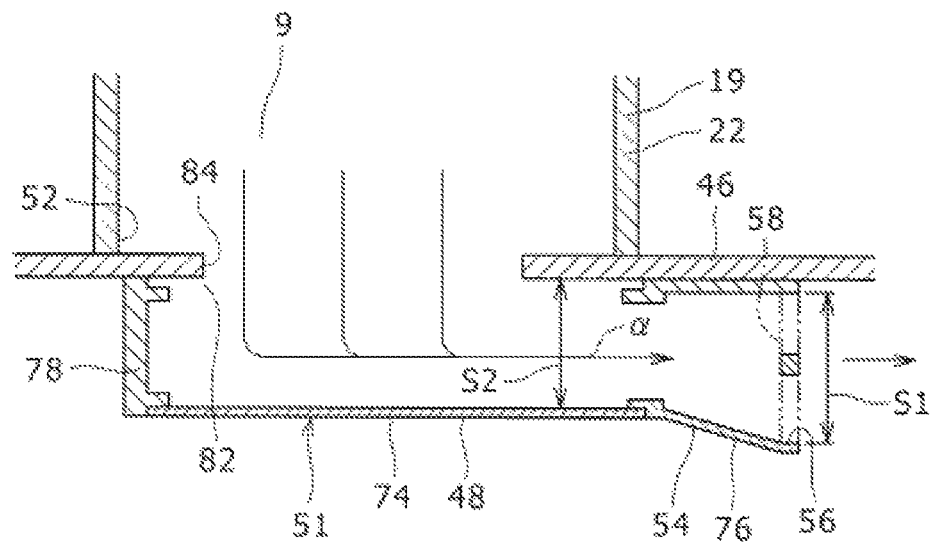
FIG. 10 is a sectional view taken along line X-X in FIG. 8.

Next, first gas discharge duct 51 is described. FIG. 8 is an enlarged perspective view showing the state where upper-most battery module 22 is connected to first gas discharge duct 51. FIG. 9 is a drawing showing an outlet of first gas discharge duct 51 viewed along arrow D in FIG. 8. FIG. 10 is a sectional view taken along lined X-X in FIG. 8.

In FIG. 8 through FIG. 10, a description is provided for the relation between uppermost battery module 22 and first gas discharge duct 51 shown in FIG. 1. The relation between battery modules 22 of the upper and lower two middle stages, or of the lowermost stage, and second gas discharge ducts 51A (FIG. 1) is the same as the above relation except that more gas discharge openings of battery modules 22 are in communication with one of second gas discharge duct 51A. Second gas discharge duct 51A is longer than first gas discharge duct 51.

Battery modules 22 are connected to frame body 46. In frame body 46, the portion facing the bottom end of each battery module 22 has first hole 70 in a rectangular shape. By bending the rectangular plate part of the inside portion of first hole 70 substantially at right angles toward the side of battery module 22, first battery supporting plate 62 is formed. Battery module 22 is mounted on first battery supporting plate 62. This configuration enhances the strength for supporting battery module 22. Terminal parts 68 of battery module 22 are lead out to one side of frame body 46 (front side in FIG. 8) via second hole 72 formed through frame body 46.

First gas discharge duct 51 is configured to include the following elements: linear first duct body 74 having a square cross-section; duct outlet member 76 and cover member 78 connected to one end and the other end, respectively, in the length direction of first duct body 74; and temperature reducing member 58 (FIG. 9) fixed to duct outlet member 76.

As shown in FIG. 10, in first duct body 74, the opening on the side of frame body 46 communicates with gas discharge opening 52 of battery module via plate hole 84 formed through frame body 46. A highly thermal-conductive sealing material (not shown) may be interposed between the periphery of the opening of first duct body 74 on the side of frame body 46 and the periphery of plate hole 84 formed through frame body 46. The sealing material blocks the gap between the periphery of the opening of first duct body 74 on the side of frame body 46 and the periphery of plate hole 84 formed through frame body 46. This configuration can enhance the airtightness of gas discharge ducts 51, 51A. Examples of the sealing material include elastomer-based material. Use of an elastomer-based material allows the heat in first duct body 74 increased by the exhaust gas to be transferred to frame body 46 through the elastomer-based material. With this configuration, frame body 46 can be used for heat dissipation and the temperature of the exhaust gas can be further reduced. Examples of the sealing material having high thermal conductivity include a material based on highly thermal-conductive elastomer that contains thermal-conductive filler.

Duct outlet member 76 includes enlarged cross-section part 54 where cross-sectional area S1 of the channel in the plane orthogonal to the length direction is gradually increased toward the downstream side in the flow direction of the gas. Specifically, enlarged cross-section part 54 is formed by connecting top face P1, bottom face P2, outer side face P3 on the opposite side of frame body 46, and inner side face P4 on the side of frame body 46. Top face P1 and bottom face P2 tilt with respect to the horizontal plane, and the space between the top face and the bottom face increases toward the outlet. Outer side face P3 tilts so as to become farther from frame body 46 toward the outlet. Inner side face P4 is shaped so as to substantially conform to the side face of frame body 46. As a result, cross-sectional area S1 of the channel in duct outlet 56, which is at the downstream end of enlarged cross-section part 54 in the flow direction of the gas, is larger than cross-sectional area S2 of the channel in first duct body 74 on the upstream side in the flow direction of the gas. Preferably, cross-sectional area S1 of the channel in duct outlet 56 at the downstream end in the flow direction of the gas is 1.5 times to 3.4 times of cross-sectional area S2 of the channel in first duct body 74. When cross-sectional area S1 of the channel is smaller than 1.5 times of cross-sectional area S2 of the channel, the periphery of duct outlet 56 of each of gas discharge ducts 51, 51A is blocked by the temperature reducing member 58. This phenomenon can increase pressure loss of the gas. When cross-sectional area S1 of the channel is larger than 3.4 times of cross-sectional area S2 of the channel, the cross-sectional area of duct outlet 56 considerably changes. This phenomenon can produce pressure loss caused by energy loss. In such a configuration, enlarged cross-section part 54 is disposed on the periphery of duct outlet 56.

When no interference occurs with the plate body, enlarged cross-section part 54 may have the following shape: inner side face P4 tilts to the plane along height direction H and length direction L so that the space between the inner side face and outer side face P3 becomes larger toward the outlet, so that cross-sectional area S1 of the channel increases toward the downstream side in the flow direction of the gas.

As shown in FIG. 9, temperature reducing member 58 is configured of a metal mesh member, i.e. wire netting, fixed to duct outlet member 76. Temperature reducing member 58 is fixed to the periphery of the duct outlet, e.g. the portion having the largest cross-section of the channel, so as to always block part of the channel. When high-temperature gas goes through the gaps in the meshes, temperature reducing member 58 reduces the temperature of the gas because temperature reducing member 58 makes contact with the gas. Preferably, in the state where temperature reducing member 58 having an open area ratio of 36% is fixed to the periphery of duct outlet 56, the ratio (A/S2) of total area A of the gaps in the meshes to cross-sectional area S2 of the channel in first duct body 74 ranges from 0.55 to 3.23 inclusive. In this case, cross-sectional area S2 of the channel is the minimum cross-sectional area of the channel on the upstream side of temperature reducing member 58 in the flow direction of the gas. When the ratio of the total area of the gaps in the meshes to cross-sectional area S2 of the channel in first duct body 74 is smaller than 0.55, the periphery of duct outlet 56 of each of gas discharge ducts 51, 51A is blocked by temperature reducing member 58. This phenomenon can increase pressure loss of the gas. When the ratio of the total area of the gaps in the meshes to cross-sectional area S2 of the channel in first duct body 74 is larger than 3.23, the volume of duct outlet 56 increases and thus the cross-sectional area of duct outlet 56 considerably changes. This phenomenon can produce pressure loss caused by energy loss. More preferably, the total area of the gaps in meshes is substantially equal to cross-sectional area S2 of the channel, which is the minimum cross-sectional area in first gas discharge duct 51 on the upstream side in the flow direction of the gas.

Cover member 78 is fixed so as to cover the opening on the other end of first duct body 74 in the length direction. In such first gas discharge duct 51, it is only necessary that first duct body 74 is made of highly thermal-conductive material. For instance, first duct body 74 may be formed of metal such as iron or aluminum. Duct outlet member 76 and cover member 78 may be made of resin.

The structure of connecting battery modules 22 of the two upper and lower middle stages and of the lowermost stage, and second gas discharge ducts 51A shown in FIG. 1 and FIG. 3 is similar to the basic configuration of the structure of connecting battery module 22 of the uppermost stage and first gas discharge duct 51. In this case, gas discharge openings provided in plurality of battery modules 22 arranged along length direction L of the stages are made in communication with corresponding second gas discharge ducts 51A of the two middle stages and on the lowermost shelf. As shown in FIG. 1, plurality of gas discharge ducts 51, 51A are arranged in upper and lower positions parallel to each other. The duct outlet of each of gas discharge ducts 51, 51A is disposed at one end in the length direction. Each duct outlet faces discharge gas blocking plate 66 that is bent substantially at right angles at one end in the length direction of frame body 46. In this case, only part of the open end of each duct outlet may face discharge gas blocking plate 66. As described below, this configuration allows the gas discharged from each of gas discharge ducts 51, 51A to be blown onto discharge gas blocking plate 66 and reduces the temperature of the gas.

In above battery system 20, each of gas discharge ducts 51, 51A in communication with gas discharge openings 52 of battery modules 22 includes enlarged cross-section part 54, and temperature reducing member 58 disposed on the periphery of the duct outlet on the downstream side of enlarged cross-section part 54 in the flow direction of the gas. This configuration can reduce the temperature of the gas jetted from battery cells 2 and discharged to the outside of battery module 22, and reduce the increase in the gas pressure inside battery module 22.

A description is provided for the above, with reference to FIG. 10. FIG. 10 is a cross-sectional view taken along line X-X in FIG. 8. When abnormality of a battery cell included in battery system 20 increases the internal pressure and thus safety valve 13 is operated, the high-temperature gas jetted from safety valve 13 is delivered to first gas discharge duct 51 through the inside of module duct 19 and gas discharge opening 52. The gas having flown to the direction shown by arrow α in FIG. 10 in first gas discharge duct 51 is discharged to the outside of battery module 22 through enlarged cross-section part 54. In this case, the temperature of the gas is reduced by heat dissipation through first gas discharge duct 51 while the gas is flowing in first gas discharge duct 51. Further, because the gas goes through the gaps in temperature reducing member 58, the heat dissipation through temperature reducing member 58 and duct outlet member 76 further reduces the temperature. Particularly when the gas is discharged from battery cell 2 disposed on the periphery of first duct body 74 near the downstream end in the flow direction of the gas, the gas flows along a short distance in first duct body 74. Thus, when the temperature reducing member is not present, gas at a relatively high temperature can be discharged. Battery system 20 of the exemplary embodiment includes temperature reducing member 58, and thus the temperature of the gas discharged from each of gas discharge ducts 51, 51A is reduced. Thus, ignition (or fire) caused by the exhaust gas can be prevented with a simple configuration.

In contrast, in a configuration including temperature reducing member without the structure of enlarged cross-section part 54 where cross-sectional area S1 of the channel in duct outlet 56 at the downstream end in the flow direction of the gas is smaller than cross-sectional area S2 of the channel in duct body 74, the peripheral part of duct outlet 56 of each of gas discharge ducts 51, 51A is excessively blocked by temperature reducing member 58. Also in a configuration where a gas discharge duct has a plurality of duct outlets, each having temperature reducing member 58, and the sum of cross-sectional areas of the channel in the duct outlets is smaller than cross-sectional area S2 of the channel, the peripheries of duct outlets 56 of the gas discharge duct are excessively blocked by temperature reducing members 58. Thus, these configurations pose a problem of increasing the pressure loss of the gas. In this case, the discharge of the gas from battery modules 22 is decreased. Battery system 20 of the exemplary embodiment has enlarged cross-section part 54 on the periphery of duct outlet 56, and thus temperature reducing member 58 can reduce the temperature of the gas. This configuration can also reduce the increase in the pressure loss and enhance the discharge of the gas from battery modules 22.

Irrespective of whether each of gas discharge ducts 51, 51A has enlarged cross-section part 54 or not, a plurality of duct outlets may be provided at both ends of each of gas discharge ducts 51, 51A so that the sum of cross-sectional areas of the channel in the duct outlets is larger than the cross-sectional area of the channel on the upstream side in the flow direction of the gas, such as cross-sectional area S2 of the channel in duct body 74. With this configuration, similarly to the configuration having enlarged cross-section part 54 described above with reference to FIG. 1 through FIG. 10, temperature reducing member 58 can reduce the temperature of the gas. This configuration can reduce the increase in the pressure loss and enhance the discharge of the gas.

Suppose in the state where temperature reducing member 58 is fixed to the periphery of duct outlet 56, the total area of the gaps in the meshes is substantially equal to cross-sectional area S2 of the channel, which is the minimum area in first gas discharge duct 51 on the upstream side in the flow direction of the gas. In this case, the effects of reducing both of the temperature of the exhaust gas and the internal pressure of battery module 22 can be exerted at a high level.

In the above description, wire netting is used as temperature reducing member 58. However, the temperature reducing member is not limited to the wire netting, and any member that satisfies the following conditions can be used. The member is fixed so as to always block part of the downstream side in the flow direction of the gas on the downstream side of enlarged cross-section part 54 in the flow direction of the gas and is capable of reducing the temperature of the gas going through the gaps. For instance, any one of a metal honeycomb member, non-woven fabric, and fire-resistant fiber can be used as the temperature reducing member. Preferably, non-woven fabric is formed of fire-resistant material.

As shown in FIG. 1 and FIG. 2, at least part of duct outlet 56 of each of gas discharge ducts 51, 51A faces discharge gas blocking plate 66. Thus, the gas discharged from each of gas discharge ducts 51, 51A is blown onto discharge gas blocking plate 66 and has a lower temperature. When the heat of the gas is transferred to discharge gas blocking plate 66, gas blocking plate 66 has high heat radiation ability, and thus is kept at a low temperature. Therefore, even when a handle or an operating part to be grasped by the user is disposed on the side wall part, for example, of a case (not shown) in the portion opposite the outlet of each gas discharge duct 51 via gas blocking plate 66, the temperature rise of this handle or operating part can be reduced.

The duct body of each of gas discharge ducts 51, 51A may be formed by connecting a plate other than frame body 46 to the side of frame body 46 of each of duct forming members 48, 50 so as to have a square cross-sectional shape. In this case, each of gas discharge ducts 51, 51A is fixed to frame body 46 but configured as a member separate from frame body 46.

Figure 11:
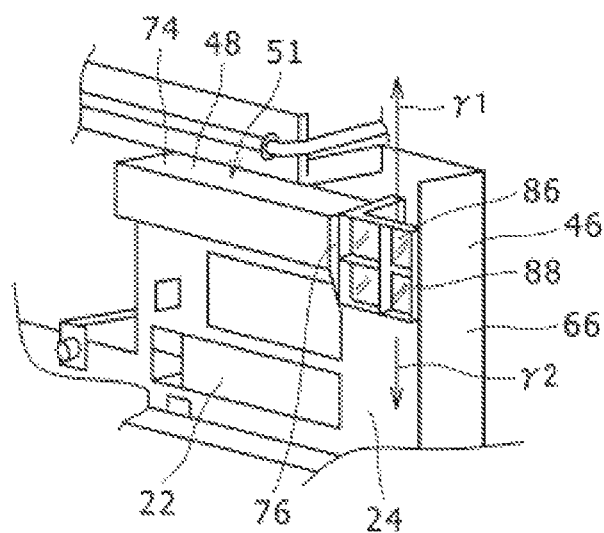
FIG. 11 is a drawing showing another example of a gas discharge duct and corresponding to FIG. 2
Figure 12A:
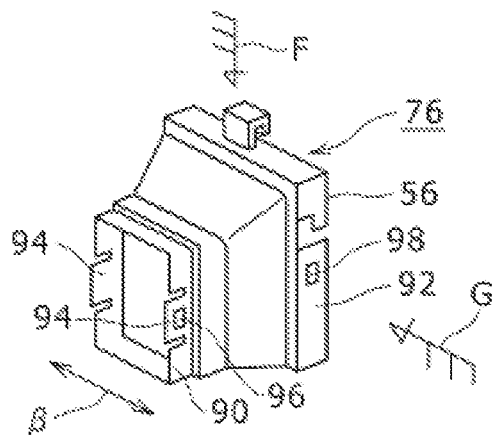
FIG. 12A is a perspective view showing a duct outlet member used in the configuration of FIG. 11.
Figure 12B:
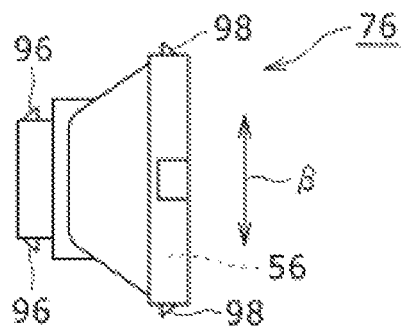
FIG. 12B is a drawing viewed from arrow F in FIG. 12A.
Figure 12C:
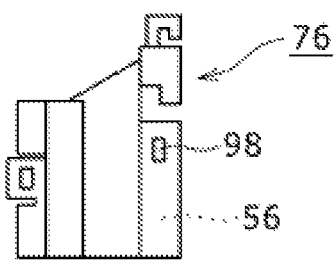
FIG. 12C is a drawing viewed from arrow G in FIG. 12A.

FIG. 11 is a diagram showing another example of first gas discharge duct 51 and corresponding to FIG. 2. In this example, in the configuration shown in FIG. 1 through FIG. 10, duct cover 86 is connected to the downstream end of duct outlet member 76 in the flow direction of the gas. Each of FIG. 12A, FIG. 12B, and FIG. 12C is a perspective view of duct outlet member 76. FIG. 12B is a drawing viewed along arrow F in FIG. 12A, and FIG. 12C is a drawing viewed along arrow G in FIG. 12A. In FIG. 12A and FIG. 12B, the vertical direction in the installation state in first duct body 74 is shown by arrow β.

First gas discharge duct 51 includes plate part 88 that is connected to duct outlet 56, projects from part of the periphery of the duct outlet along the discharge direction, and limits the flow direction of the gas discharged from duct outlet 56. Specifically, first gas discharge duct 51 is configured so as to include duct cover 88 connected to the duct outlet of duct outlet member 76.

Duct outlet member 76 includes upstream side connecting part 90 connectable to the downstream end of first duct body 74 at the upstream end in the flow direction of the gas, and downstream side connecting part 92 connectable to duct cover 86 at the downstream end in the flow direction of the gas. Upstream side connecting part 90 is formed into a cylinder having a square cross-section that can be fitted to the inside of the opening of first duct body 74 at the downstream end in the flow direction of the gas, and has projection 96 formed on the outside of each of two elastic pieces 94 at the corresponding one of two ends in the vertical direction. In the state where upstream side connecting part 90 is fitted to first duct body 74 at the downstream end in the flow direction of the gas, projections 96 engage the corresponding engaging grooves (not shown) formed at ends of first duct body 74. Thus, a simple structure can prevent duct outlet member 76 from falling off from first duct body 74.

On the outer face on each of the two ends of downstream side connecting part 92 in the vertical direction, second projection 98 having a triangular cross-section is formed.

Figure 13:
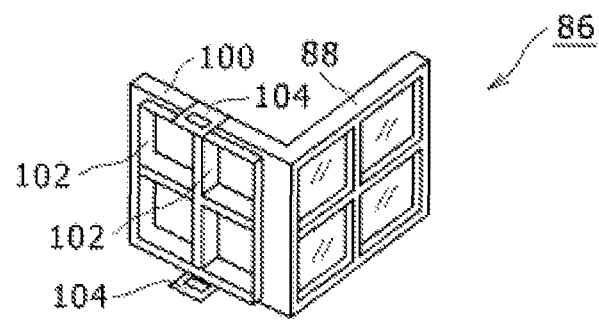
FIG. 13 is a perspective view showing a duct cover for use in the configuration of FIG. 11.

FIG. 13 is a perspective view of duct cover 86. Duct cover 86 includes frame 100 and plate part 88, i.e. a projected wall, connected with each other in an L shape. Frame 100 has a square external shape and is reinforced by a cross-shaped reinforcement part inside. Third holes 102 are formed in the frame. On the external face on each of two ends in the vertical direction of frame 100, elastic piece 104 projects in the axial direction. Each of elastic pieces 104 has a hole formed therein.

Such duct cover 86 is connected to duct outlet member 76 by engaging the holes in elastic pieces 104 with corresponding second projections 98 of duct outlet member 76 so that plate part 88 is disposed on the front side in FIG. 11. The edge of plate part 88 abuts on discharge gas blocking plate 66 or is opposed thereto via a small space.

With the above configuration, the flow of the gas discharged from first gas discharge duct 51 via third holes 102 of duct cover 86 is blocked by plate part 88 and discharge gas blocking plate 66, and goes in the direction shown by arrows γ1 and γ2. Such a structure is effective when a component whose temperature rise is not desirable is installed on the front side of plate part 88 of battery system 20 in FIG. 11.

Figure 14:
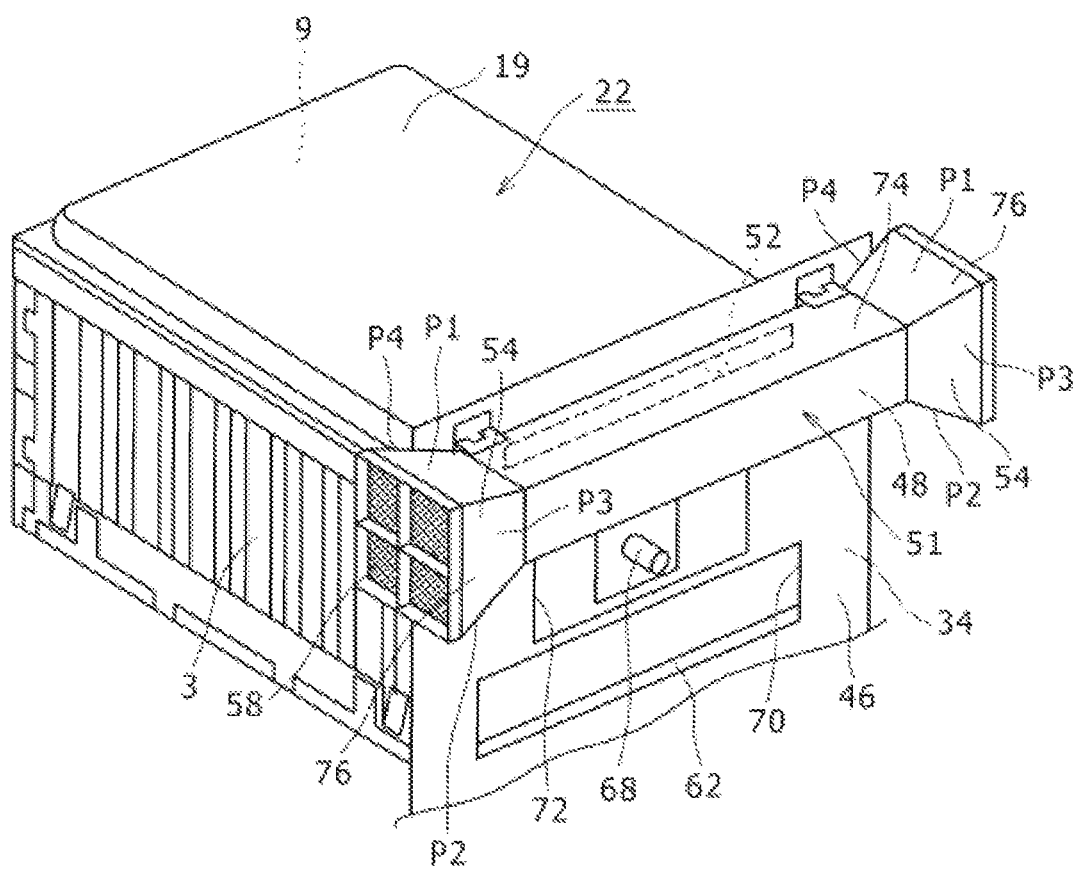
FIG. 14 is a drawing showing another example, i.e. a second example, of the gas discharge duct and corresponding to FIG. 8.

FIG. 14 is a diagram showing another example, i.e. a second example, of first gas discharge duct 51 and corresponding to FIG. 8. In this example, in the configuration shown in FIG. 1 through FIG. 10, duct outlet member 76 is disposed on each of two ends in the length direction of each of gas discharge ducts 51, 51A. Thus, the gas jetted from the battery cells in battery modules 22 can be discharged from both of two duct outlet members 76. The shape of each duct outlet member 76 is similar to the case of the configurations of FIG. 1 through FIG. 10. FIG. 14 shows first gas discharge duct 51 connected to battery module 22 of the uppermost stage. Similar second gas discharge ducts 51A are connected to battery modules 22 of the stages other than the uppermost stage. Also such a configuration can efficiently reduce the temperature of the exhaust gas and reduce the increase in the pressure inside battery modules 22. In the configuration of FIG. 14, similarly to the configurations of FIG. 11 through FIG. 13, duct covers 86 may be connected to the duct outlet of each of gas discharge ducts 51, 51A. Suppose, in the case where temperature reducing member 58 is fixed to the periphery of duct outlet 56 without enlarged cross-section part 54, the ratio (A/S2) of total area A of the gaps in the meshes to cross-sectional area S2 of the channel in first duct body 74 is larger than 0.55. In this case, the increase in the pressure inside battery modules 22 can be reduced. The following configuration can also be used. In the configuration of FIG. 14, no enlarged cross-section part 54 is provided in each duct outlet in each of gas discharge ducts 51, 51A, and the sum of cross-sectional areas of channels in the duct outlets is larger than the cross-sectional areas of the channels on the upstream side in the flow direction of the gas.

Figure 15:
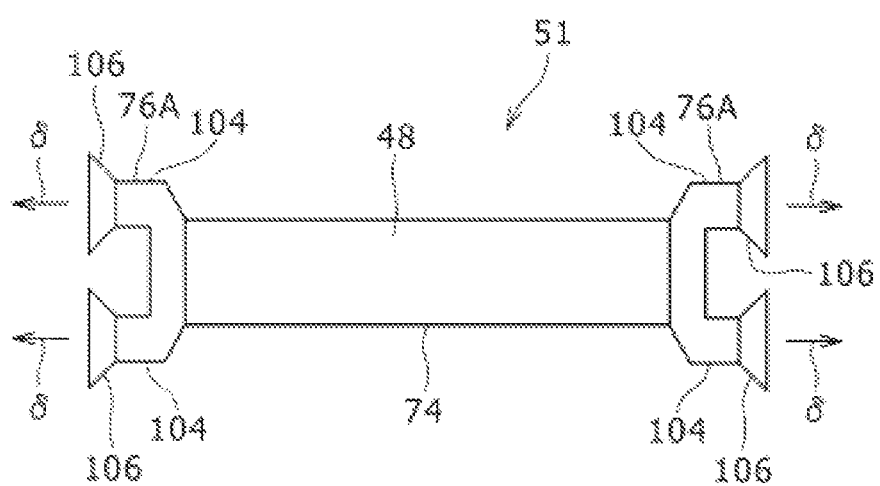
FIG. 15 is a drawing showing still another example, i.e. a third example, of the gas discharge duct.

FIG. 15 is a drawing showing still another example, i.e. a third example, of first gas discharge duct 51. Similarly to the case of the configuration of FIG. 14, first gas discharge duct 51 is configured so as to include second duct outlet member 76A at each of two ends in the length direction. Each second duct outlet member 76A includes legs 104 forking from the connecting part of duct body 74, and the tip of each leg 104 has second enlarged cross-section part 106 where the cross-sectional area of the channel is increased toward the downstream side in the flow direction of the gas. The opening of second enlarged cross-section part 106 at the downstream end in the flow direction of the gas is a duct outlet. In second enlarged cross-section part 106, four plane parts are connected so as to form a square cross-section. On the periphery of each duct outlet, temperature reducing member 58 (see FIG. 9) is disposed.

Such first gas discharge duct 51 is connected to battery module 22 of each stage. The gas jetted from a battery cell in battery module 22 is discharged from the duct outlets of duct outlet member 76A, for example, in the direction shown by arrow δ in FIG. 15. In the configuration of FIG. 15, each duct outlet in first gas discharge duct 51 may have no second enlarged cross-section part 106 and the sum of the cross-sectional areas of the channel in the duct outlets may be larger than the cross-sectional area of the channel on the upstream side in the flow direction of the gas.

In the configurations of FIG. 1 to FIG. 15 shown above, a description is provided for battery system 20 that includes plurality of battery modules 22 and plurality of gas discharge ducts 51, 51A connected to frame body 46, and includes inverter 26 and circuit board 30. However, the battery unit of the present disclosure is not limited to such a configuration, and a battery unit without an inverter and a circuit board may be used. Alternatively, a battery unit in which one battery module 22 is connected to one gas discharge duct via frame body 46 may be used. Alternatively, a battery unit in which gas discharge ducts are connected to battery modules 22 without frame body 46 may be used.

Figure 16:
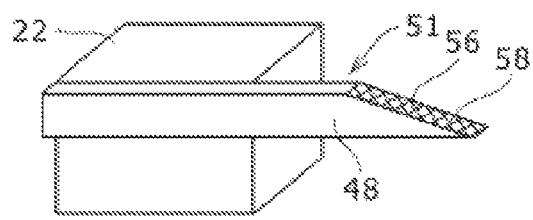
FIG. 16 is a perspective view showing another example, i.e. a first example, of the battery unit in accordance with the exemplary embodiment of the present disclosure.

The shapes of gas discharge ducts 51, 51A and the positional relation between gas discharge ducts 51, 51A and battery modules 22 are not limited to the above configuration, and may have configurations shown in other examples, i.e. a first example to a fourth example, as described below. FIG. 16 is a perspective view showing the first example of the battery unit. In the configuration of this example, first gas discharge duct 51 is in communication with the gas discharge opening of battery module 22. Duct outlet 56 of first gas discharge duct 51 has an opening tilting with respect to the length direction of first gas discharge duct 51. The cross-sectional area of the channel in the opening of duct outlet 56 is larger than the cross-sectional area of the channel in first gas discharge duct 51 on the upstream side in the flow direction of the gas. The configuration of battery module 22 is the same as the case of each of battery module 22 in the configurations of FIG. 1 through FIG. 10.

Figure 17:
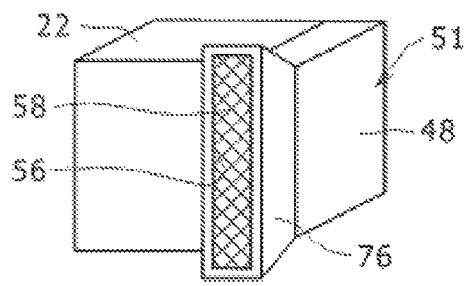
FIG. 17 is a perspective view showing still another example, i.e. a second example, of the battery unit in accordance with the exemplary embodiment of the present disclosure.

FIG. 17 is a perspective view showing the second example of the battery unit. In the configuration of this example, first gas discharge duct 51 having a dimension in the height direction substantially equal to that in the height direction (vertical direction in FIG. 17) of battery module 22 is connected to battery module 22. First gas discharge duct 51 is in communication with the gas discharge opening of battery module 22. Both side faces of duct outlet member 76 in the width direction (vertical direction in FIG. 15) tilt so that the space between both side faces increases toward the downstream side in the flow direction of the gas. The other configuration and action are the same as those in the configuration of FIG. 16.

Figure 18:
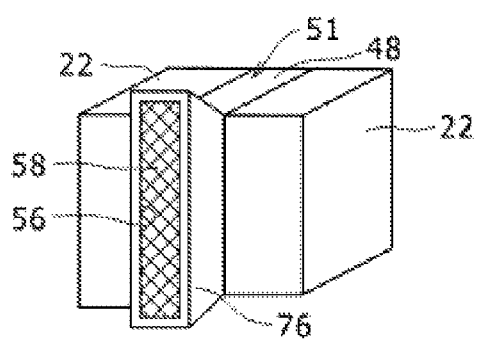
FIG. 18 is a perspective view showing yet another example, a third example, of the battery unit in accordance with the exemplary embodiment of the present disclosure.

FIG. 18 is a perspective view showing the third example of the battery unit. The battery unit of this example includes two battery modules 22 and first gas discharge duct 51 interposed between two battery modules 22. The gas discharge opening (not shown) provided in each battery module 22 is in communication with first gas discharge duct 51. The other configuration and action are the same as those in the configuration of FIG. 17.

Figure 19:
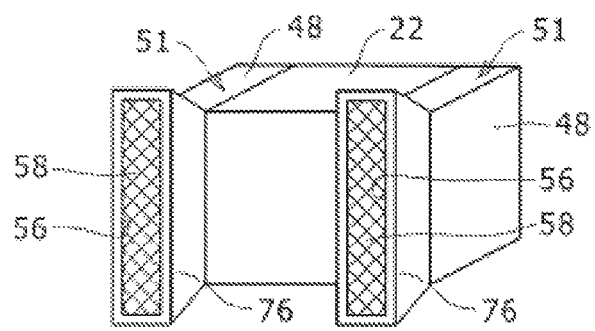
FIG. 19 is a perspective view showing still another example, i.e. a fourth example, of the battery unit in accordance with the exemplary embodiment of the present disclosure.

FIG. 19 is a perspective view showing the fourth example of the battery unit. In the battery unit of this example, two first gas discharge ducts 51 are connected to corresponding sides of battery module 22 in the width direction thereof, and the gas discharge opening (not shown) provided in battery module 22 is in communication with first gas discharge ducts 51. In such a configuration, gas is discharged from the inside of battery module 22 through two first gas discharge ducts 51. The other configuration and action are the same as those in the configuration of FIG. 17.

Similarly to the configurations of FIG. 1 through FIG. 10 shown above, for the configuration of connecting battery module 22 and first gas discharge duct 51 in battery system 20, any one of the connection configurations of FIG. 16 through FIG. 19 may be used.

The above description has given the exemplary embodiment for implementing the present disclosure. However, the present disclosure is not limited to such an exemplary embodiment, and of course, various embodiments can be made within the scope without departing from the spirit of the present disclosure. For instance, the cross-sectional shape of duct bodies 74, 75 included in corresponding gas discharge ducts 51, 51A is not limited to a square, and may be circular, oval, or a polygonal shape other than a square. The enlarged cross-section part of each of gas discharge ducts 51, 51A is not limited to a shape formed by a plurality of plane parts so as to have a square cross-section. The cross-sectional shape may be circular, oval, or a polygonal shape other than a square.

The invention claimed is:

1. A battery unit comprising:
   a battery module including a plurality of battery cells and a gas discharge opening for discharging gas jetted from each of the battery cells, each of the battery cells having a safety valve for releasing gas from a given battery cell; and
   a gas discharge duct in communication with the gas discharge opening and discharging the gas to an outside of the battery module,
   wherein the gas discharge duct includes:
   at least one duct outlet of which cross-sectional area of a channel in the duct outlet or a sum of cross-sectional areas of the channels in each one of the duct outlets is larger than a cross-sectional area of the channel on an upstream side in a flow direction of the gas; and
   a temperature reducing member fixed to a periphery of the duct outlet so as to block a part of the channel for reducing a temperature of the gas going through gaps.

2. The battery unit of claim 1, wherein the gas discharge duct has an enlarged cross-section part disposed on the periphery of the duct outlet so that a cross-sectional area of the channel in the enlarged cross-section part is increased toward a downstream side in the flow direction of the gas.

3. The battery unit of claim 1, wherein
   the temperature reducing member is a mesh member, and
   in a state where the temperature reducing member is fixed to the periphery of the duct outlet, a ratio (A/S2) of total area A of the gaps in meshes to minimum cross-sectional area S2 of the channel on the upstream side of the temperature reducing member in the flow direction of the gas in the gas discharge duct ranges from 0.55 to 3.23 inclusive.

4. The battery unit of claim 1, wherein the gas discharge duct includes a duct cover that is connected to the duct outlet, projects from part of the periphery of the duct outlet along a discharge direction, and limits the flow direction of the gas discharged from the duct outlet.

5. The battery unit of claim 1, wherein
   the gas discharge duct includes:
   a duct body having a linear discharge passage in communication with the gas discharge opening; and
   a duct outlet member connected to the duct body on a downstream side in the flow direction of the gas and having the duct outlet.

6. The battery unit of claim 1, further comprising a sealing material having a high thermal conductivity, wherein the gas discharge duct is in communication with a periphery of the gas discharge opening via the sealing material.

* * * * *